United States Patent
Nishimura et al.

(10) Patent No.: US 11,280,917 B2
(45) Date of Patent: Mar. 22, 2022

(54) INFORMATION PROCESSING SYSTEM, STORAGE MEDIUM STORING INFORMATION PROCESSING PROGRAM, AND CONTROL METHOD

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 16/458,444

(22) Filed: Jul. 1, 2019

(65) Prior Publication Data

US 2020/0041657 A1 Feb. 6, 2020

(30) Foreign Application Priority Data

Jul. 31, 2018 (JP) .............................. JP2018-143767

(51) Int. Cl.
  *G01S 19/05* (2010.01)
  *G01S 19/09* (2010.01)
  (Continued)

(52) U.S. Cl.
  CPC .......... *G01S 19/423* (2013.01); *G01S 19/258* (2013.01); *G01S 19/41* (2013.01); *G01S 19/425* (2013.01); *G01S 19/45* (2013.01); *G08G 1/20* (2013.01)

(58) Field of Classification Search
  CPC .......... B60W 30/16; B60W 30/18154; B60W 40/06; B60W 10/06; B60W 10/18;
  (Continued)

(56) References Cited

U.S. PATENT DOCUMENTS

| 2005/0137786 A1* | 6/2005 | Breed | G05D 1/0246 |
| | | | 701/482 |
| 2016/0161265 A1* | 6/2016 | Bagheri | G01C 21/32 |
| | | | 701/450 |
| 2019/0033465 A1* | 1/2019 | Kido | G01S 19/22 |

FOREIGN PATENT DOCUMENTS

| JP | 2010019588 A | * 1/2010 |
| JP | 2012-168034 A | 9/2012 |

(Continued)

*Primary Examiner* — Abby Y Lin
*Assistant Examiner* — Hossam M Abd El Latif
(74) *Attorney, Agent, or Firm* — Oliff PLC

(57) ABSTRACT

An information processing system includes a server and a first vehicle acquiring a combination of first and second position information of the first vehicle. The first position information is calculated using a positioning signal from the first satellite system. The second position information is obtained by correcting an error of the first position information using a positioning reinforcement signal from the second satellite system. The first vehicle or the server calculates difference information between the first and second position information for each combination thereof. The server estimates a calculation accuracy for the first position information in a road section on a road map based on one or more pieces of difference information in which one or more positions indicated by the second position information corresponding to the difference information are within the road section and to output the calculation accuracy for the first position information in the road section.

6 Claims, 7 Drawing Sheets

(51) Int. Cl.
*G01S 19/25* (2010.01)
*G01S 19/28* (2010.01)
*G01S 19/39* (2010.01)
*G01S 19/41* (2010.01)
*G01S 19/42* (2010.01)
*G01S 19/45* (2010.01)
*G08G 1/00* (2006.01)

(58) Field of Classification Search
CPC ......... B60W 10/20; B60W 2050/0071; B60W 50/0073; B60W 2050/0078; B60W 30/02; B60W 30/04; B60W 30/14; B60W 30/18172; B60W 40/072; B60W 40/076; B60W 50/00; B60W 50/14; B60W 2554/801; B60W 2556/65; B60W 30/095; B60W 40/04; B60W 30/08; G01S 19/423; G01S 19/425; G01S 1/20; G01S 19/45; G01S 19/258; G01S 19/41; G01S 19/09; G01S 19/396; G01S 19/05; G01S 19/28; G01S 19/252
USPC ...................................................... 701/482
See application file for complete search history.

(56) References Cited

FOREIGN PATENT DOCUMENTS

| JP | 2013-190387 A | 9/2013 |
|---|---|---|
| JP | 2018-073010 A | 5/2018 |

\* cited by examiner

FIG. 4

| IDENTIFICATION INFORMATION OF ROAD SECTION | FIRST POSITION INFORMATION | SECOND POSITION INFORMATION | DIFFERENCE INFORMATION | CALCULATION ACCURACY |
|---|---|---|---|---|
| R1 | P1 | Q1 | D1 | S |
| | P2 | Q2 | D2 | |
| | ... | ... | ... | |
| | Pn | Qn | Dn | |

INFORMATION PROCESSING SYSTEM, STORAGE MEDIUM STORING INFORMATION PROCESSING PROGRAM, AND CONTROL METHOD

CROSS-REFERENCE TO RELATED APPLICATIONS

This application claims priority to Japanese Patent Application No. 2018-143767 filed on Jul. 31, 2018, which is incorporated herein by reference in its entirety.

BACKGROUND

1. Technical Field

The disclosure relates to an information processing system, a storage medium storing an information processing program, and a control method.

2. Description of Related Art

In the related art, a technique of calculating position information using a satellite system is known. For example, Japanese Unexamined Patent Application Publication No. 2013-190387 (JP 2013-190387 A) discloses a communication device that receives visible satellite information, which indicates Global Positioning System (GPS) satellites from which a positioning signal can be received, from a quasi-zenith satellite when information of GPS satellites from which a positioning signal can be received is not acquired.

SUMMARY

A calculation accuracy for position information using a global constellation such as the GPS can be affected by an ambient environment of a receiver that receives positioning signals from satellites. For example, in an area crowded with constructions such as buildings, a calculation accuracy for position information can decrease. Accordingly, there is demand for preparation of map data on which a calculation accuracy for position information is mapped.

The disclosure provides an information processing system, a storage medium storing an information processing program, and a control method for an information processing device that can enable preparation of map data on which a calculation accuracy for position information using a global constellation such as the GPS is mapped.

According to a first aspect of the disclosure, there is provided an information processing system including a first vehicle and a server. The first vehicle is configured to receive signals from a first satellite system and a second satellite system. The server is configured to communicate with the first vehicle. The first vehicle is configured to acquire a combination of first position information and second position information of the first vehicle. The first position information is information which is calculated using a positioning signal from the first satellite system. The second position information is information which is obtained by correcting an error of the first position information using a positioning reinforcement signal from the second satellite system. The first vehicle or the server is configured to calculate difference information between the first position information and the second position information for each combination of the first position information and the second position information which is acquired by the first vehicle. The server is configured to estimate a calculation accuracy for the first position information in a road section on a road map based on one or more pieces of difference information in which one or more positions indicated by the second position information corresponding to the difference information are within the road section and to output the calculation accuracy for the first position information in the road section.

In the information processing system according to the first aspect, the server may be configured to estimate the calculation accuracy for the first position information in the road section based on an average value of the one or more pieces of difference information. The server may be configured to estimate one of the calculation accuracy which are a plurality of levels from "high" to "low" based on the average value of the one or more pieces of difference information as the calculation accuracy.

In the information processing system according to the first system, the first satellite system may include a global constellation and the second satellite system may include a local constellation.

The information processing system according to the first aspect may further include a second vehicle configured to communicate with the server. (i) The second vehicle may be configured to receive the calculation accuracy for the first position information in the road section which is output from the server, and (ii) the second vehicle may be configured to perform an operation based on the calculation accuracy during travel in the road section.

In the information processing system according to the first aspect, (i) the second vehicle may be configured to be able to receive a positioning signal from the first satellite system and not to be able to receive a positioning reinforcement signal from the second satellite system, (ii) the second vehicle may be configured to perform a first operation during travel in the road section when the calculation accuracy received from the server is equal to or greater than a reference calculation accuracy, the first operation requiring position information of the second vehicle with a high accuracy satisfying a predetermined reference, and (iii) the second vehicle may be configured to perform a second operation or a third operation during travel in the road section when the calculation accuracy received from the server is less than the reference calculation accuracy. The second operation may be able to be performed using position information of the second vehicle with a low accuracy not satisfying the predetermined reference and the third operation may be able to be performed without using position information of the second vehicle.

According to a second aspect of the disclosure, there is provided a computer-readable storage medium storing an information processing program. The information processing program performs operations of an information processing device configured to communicate with a first vehicle configured to receive signals from a first satellite system and a second satellite system. The operations perform: (i) receiving a combination of first position information and second position information of the first vehicle from the first vehicle, the first position information being information which is calculated using a positioning signal from the first satellite system, the second position information being information which is obtained by correcting an error of the first position information using a positioning reinforcement signal from the second satellite system; (ii) calculating difference information between the first position information and the second position information for each combination of the first position information and the second position information which are received from the first vehicle; (iii) estimating a calculation accuracy for the first position information in a road section on a road map based on one or more pieces of difference information in which one or more positions indicated by the second position information corresponding to the difference information are within the road section; and (iv) outputting the calculation accuracy for the first position information in the road section.

According to a third aspect of the disclosure, there is provided a control method for an information processing device configured to communicate with a first vehicle which is configured to receive signals from a first satellite system and a second satellite system. The control method includes: (i) receiving a combination of first position information and second position information of the first vehicle from the first vehicle, the first position information being information which is calculated using a positioning signal from the first satellite system, the second position information being information which is obtained by correcting an error of the first position information using a positioning reinforcement signal from the second satellite system; (ii) calculating difference information between the first position information and the second position information for each combination of the first position information and the second position information which are received from the first vehicle; (iii) estimating a calculation accuracy for the first position information in a road section on a road map based on one or more pieces of difference information in which one or more positions indicated by the second position information corresponding to the difference information are within the road section; and (iv) outputting the calculation accuracy for the first position information in the road section.

With the information processing system according to the first aspect, the storage medium storing the information processing program according to the second aspect, and the control method according to the third aspect, it is possible to prepare map data on which a calculation accuracy for position intimation using a global constellation such as the GPS is mapped.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram illustrating a part of a database stored in the server;

DETAILED DESCRIPTION OF EMBODIMENTS

Figure 1:
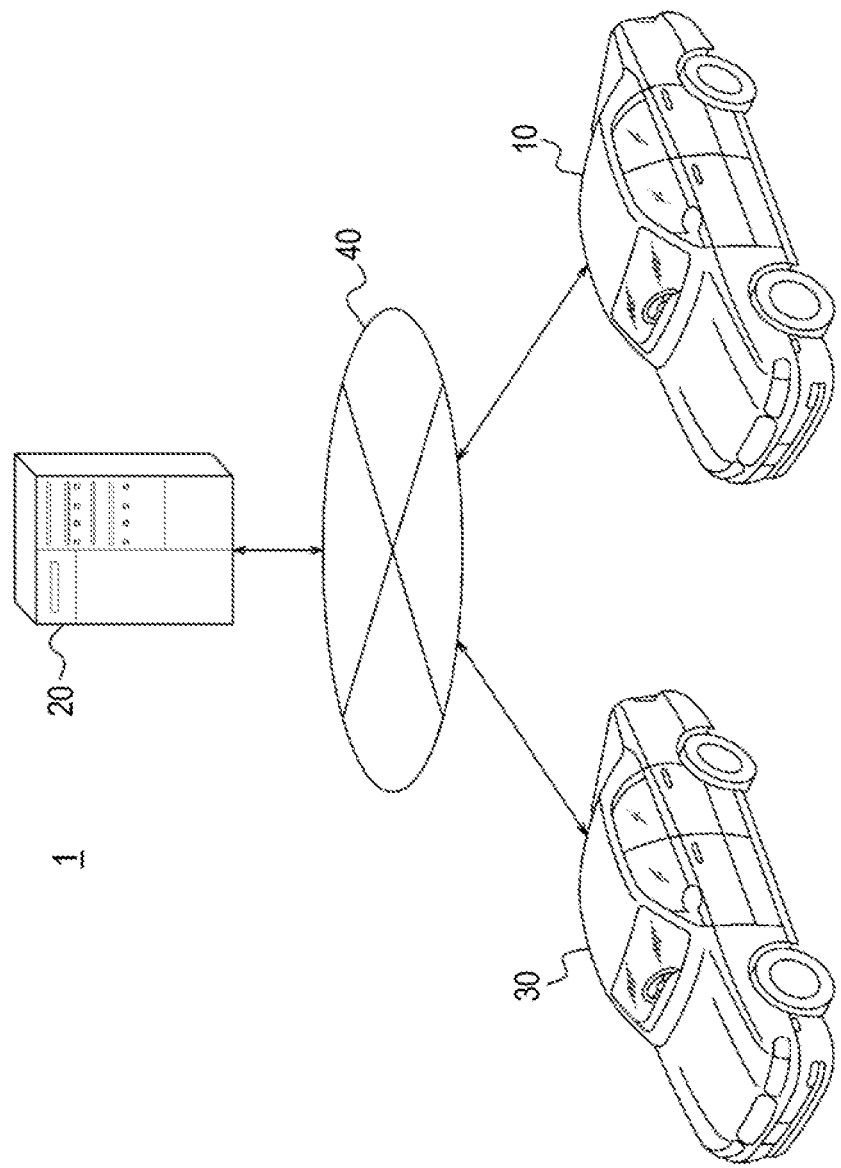
FIG. 1 is a diagram schematically illustrating a configuration of an information processing system according to an embodiment of the disclosure.

Hereinafter, an embodiment of the disclosure will be described. A configuration of an information processing system according to an embodiment will be first described below. An outline of an information processing system 1 according to an embodiment of the disclosure will be described with reference to FIG. 1. The information processing system 1 includes a first vehicle 10, a server 20, and a second vehicle 30. The first vehicle 10 and the second vehicle 30 are, for example, automobiles, but are not limited thereto and may be arbitrary vehicles. In FIG. 1, one first vehicle 10 and one second vehicle 30 are illustrated for the purpose of convenience of description, but the number of first vehicles 10 and the number of second vehicles 30 which are included in the information processing system 1 may each be two or more. The server 20 includes one information processing device or a plurality of information processing devices (for example, server devices) that can communicate with each other. The server 20 can communicate with a client, for example, via a network 40 including a mobile communication network and the Internet. In this embodiment, the client includes the first vehicle 10 and the second vehicle 30, but it is not limited thereto and may include, for example, an arbitrary information processing device such as a smartphone or a computer.

The first vehicle 10 receives a positioning signal from a first satellite system and receives a positioning reinforcement signal from a second satellite system. The first vehicle 10 calculates position information of the host vehicle based on the positioning signal from the first satellite system. In the following description, position information which is calculated based on a positioning signal from the first satellite system is also referred to as first position information P. The first vehicle 10 corrects an error of the first position information P based on the positioning reinforcement signal from the second satellite system. In the following description, the first position information P which is corrected based on the positioning reinforcement signal from the second satellite system is also referred to as second position information Q. The first vehicle 10 transmits a combination of the first position information P and the second position information Q as probe data to the server 20.

In this embodiment, the first satellite system is the GPS, but is not limited thereto and may be an arbitrary global constellation such as Galileo, the Global Navigation Satellite System (GLONASS), or the BeiDou Navigation System (BDS). Positioning signals from the GPS include an L1 signal and an L5 signal. In general, the first position information P which is calculated based on the positioning signals from the GPS may have a calculation error of about 10 m. As described above, the environment of an area in which the positioning signals are received affects the magnitude of the calculation error of the first position information P. For example, in an area crowded with constructions such as buildings, the calculation error of the first position information P may increase.

In this embodiment, the second satellite system is a quasi-zenith satellite system (QZSS), but it is not limited thereto and may be an arbitrary local constellation such as Navigation with Indian Constellation (NavIC) or Doppler Orbitography and radio-positioning Integrated by Satellite (DORIS). The positioning reinforcement signal from the QZSS is an L6 signal. Since a QZSS satellite is located at a higher elevation angle than GPS satellites when seen from a corresponding area (near Japan), the environment of the area in which signals are received affects the second position information Q less than the first position information P. In general, an error of the second position information Q which is calculated based on the positioning reinforcement signal from the QZSS is reduced to about several cm. In this way, the second position information Q has a higher accuracy than the first position information P.

The server 20 estimates a calculation accuracy for the first position information P in each road section on a road map based on probe data received from one or more first vehicles 10 and maps the calculation accuracy onto the corresponding road section. Here, the calculation accuracy for the first position information P in a road section is an index indicating certainty of the first position information P which is calculated based on positioning signals received in the road section. In this way, in this embodiment, road map data in which the calculation accuracy for first position information P is mapped onto each road section can be prepared using the probe data transmitted from the first vehicle 10. Road map data in which the calculation accuracy for first position information P is mapped onto each road section may be output from the server 20 and transmitted to an arbitrary client. For example, the server 20 outputs a calculation accuracy for first position information P in a road section and transmits the calculation accuracy to the second vehicle 30.

The second vehicle 30 is a vehicle that can receive positioning signals from the first satellite system and cannot receive a positioning reinforcement signal from the second satellite system. When the first position information P of the host vehicle is calculated, the second vehicle 30 can recognize certainty of the first position information P based on the calculation accuracy received from the server 20. The second vehicle 30 performs an operation based on the received calculation accuracy during travel in the corresponding road section. For example, when the received calculation accuracy is high, the second vehicle 30 performs a first operation requiring position information of the host vehicle with a relatively high accuracy. The first operation is, for example, lane-based traffic guidance. When the received calculation accuracy is low, the second vehicle 30 performs a second operation which can be performed using the position information of the host vehicle with a relatively low accuracy or a third operation which can be performed without using the position information of the host vehicle. The second operation is, for example, normal traffic guidance in which lanes are not distinguished. The third operation is, for example, advertisement display. In this way, the second vehicle 30 can perform an appropriate operation based on the calculation accuracy of the first position information P using road map data from the server 20.

Figure 2:
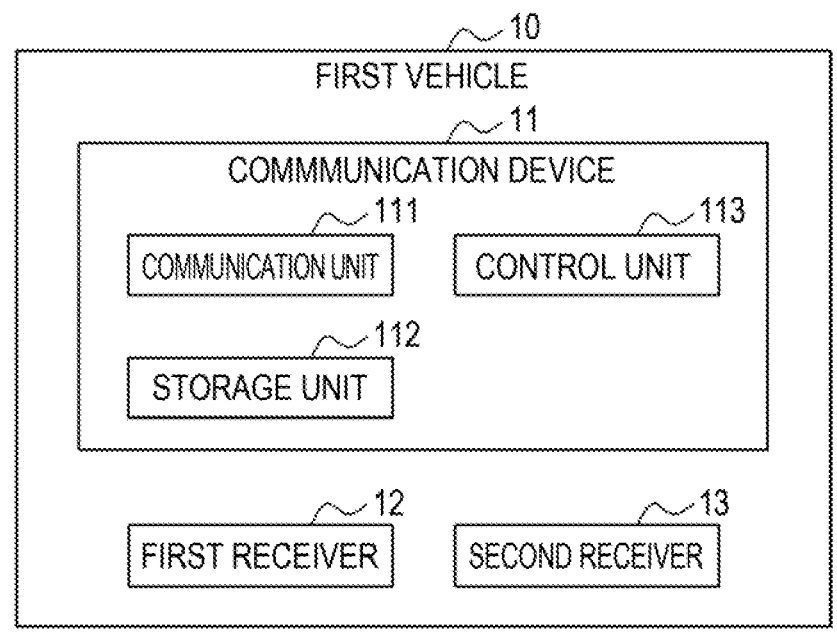
FIG. 2 is a block diagram schematically illustrating a configuration of a first vehicle illustrated in FIG. 1.

The elements of the information processing system 1 will be described below in detail. First, the configuration of the first vehicle will be described. As illustrated in FIG. 2, the first vehicle 10 includes a communication device 11, a first receiver 12, and a second receiver 13. The communication device 11. the first receiver 12. and the second receiver 13 are communicatively connected to each other via an onboard network such as a controller area network (CAN) or a dedicated line.

The communication device 11 is an onboard communication device such as a data communication module (DCM). Specifically, the communication device 11 includes a communication unit 111, a storage unit 112, and a control unit 113.

The communication unit 111 includes a communication module that performs communication via an onboard network or a dedicated line. The communication unit 111 includes a communication module that is connected to the network 40. For example, the communication unit 111 may include a communication module corresponding to mobile communication standards such as 4-th generation (4G) and 5-th generation (5G). In this embodiment, the first vehicle 10 is connected to the network 40 via the communication unit 111.

The storage unit 112 includes one or more memories. In this embodiment, a "memory" is, for example, a semiconductor memory, a magnetic memory, or an optical memory, but it is not limited thereto. Each memory included in the storage unit 112 may serve as, for example, a main storage device, an auxiliary storage device, or a cache storage device. The storage unit 112 stores arbitrary information which is used for operation of the communication device 11. For example, the storage unit 112 may store a system program, an application program, incorporated software, and identification information of the first vehicle 10. Here, identification information of the communication device 11, the first receiver 12, or the second receiver 13 in the first vehicle 10 may be used as the identification information of the first vehicle 10. Information stored in the storage unit 112 may be updated with, for example, information which is acquired from the network 40 via the communication unit 111.

The control unit 113 includes one or more processors. In this embodiment, a "processor" is a general-purpose processor or a dedicated processor specialized for a specific process, but is not limited thereto. The control unit 113 controls the whole operation of the communication device 11.

For example, the control unit 113 acquires a combination of the first position information P calculated by the first receiver 12 and the second position information Q calculated by the second receiver 13 via the communication unit 111 as will be described later. The control unit 113 transmits probe data including the identification information of the first vehicle 10 and the acquired combination of the first position information P and the second position information Q to the server 20 via the communication unit 111. The probe data may be transmitted when the combination of the first position information P and the second position information Q is acquired, or may be transmitted after the combination has been stored in the storage unit 112 for a predetermined period. The probe data is not limited to the above-mentioned information and may further include arbitrary information on the first vehicle 10 such as a speed, acceleration, and a steering angle of the first vehicle 10.

The first receiver 12 is a receiver corresponding to the first satellite system. Specifically, the first receiver 12 includes a communication module that receives positioning signals from the first satellite system, a communication module that performs communication via an onboard network or a dedicated line, a memory, and a processor. The first receiver 12 receives positioning signals from at least three visible satellites which are included in the first satellite system. In this embodiment, the first satellite system is the GPS, and the positioning signals include an L1 signal and an L5 signal. The first receiver 12 calculates first position information P of the host vehicle based on the received positioning signals and outputs the calculated first position information P.

The second receiver 13 is a receiver corresponding to the second satellite system. Specifically, the second receiver 13 includes a communication interface that receives a positioning reinforcement signal from the second satellite system, a communication module that performs communication via an onboard network or a dedicated line, a memory, and a processor. The positioning reinforcement signal is received from at least one visible satellite which is included in the second satellite system. In this embodiment, the second satellite system is a QZSS, and the positioning reinforcement signal includes an L6 signal. The second receiver 13 calculates second position information Q which is obtained by correcting an error of the first position information P of the host vehicle acquired from the first receiver 12 using the positioning reinforcement signal and outputs the calculated second position information Q to the communication device 11.

Figure 3:
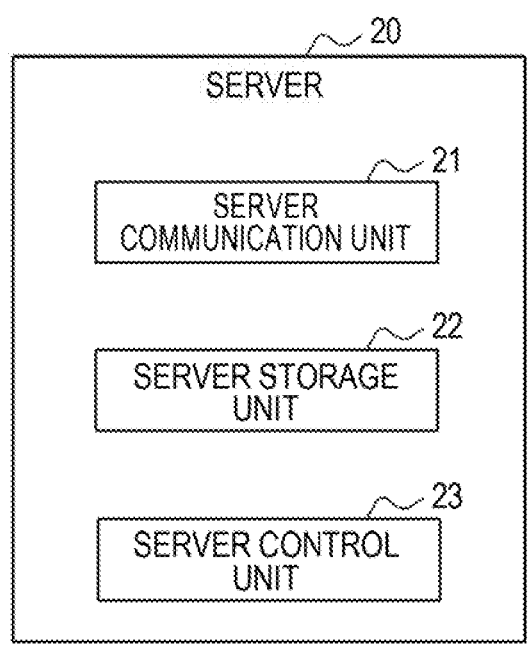
FIG. 3 is a block diagram schematically illustrating a configuration of a server illustrated in FIG. 1.

The configuration of the server will be described below. As illustrated in FIG. 3, the server 20 includes a server communication unit 21, a server storage unit 22, and a server control unit 23.

The server communication unit 21 includes a communication module that is connected to the network 40. For example, the server communication unit 21 may include a communication module corresponding to a wired local area network (LAN) standard. In this embodiment, the server 20 is connected to the network 40 via the server communication unit 21.

The server storage unit 22 includes one or more memories. Each memory included in the server storage unit 22 may serve as, for example, a main storage device, an auxiliary storage device, or a cache storage device. The server storage unit 22 stores arbitrary information which is used for operation of the server 20. For example, the server storage unit 22 may store a system program, an application program, road map data, identification information of one or more road sections, and a database storing the probe data received from the first vehicle 10. The identification information of a road section is information capable of uniquely identifying the road section on a road map and may be, for example, information indicating an area on the road map corresponding to the road section or may be an ID correlated in advance with the road section. When a road link included in the road map data is employed as a "road section," the identification information of a road section may be a road link ID. Information stored in the server storage unit 22 may be updated with, for example, information which is acquired from the network 40 via the server communication unit 21.

The server control unit 23 includes one or more processors. The server control unit 23 controls the whole operation of the server 20. For example, the server control unit 23 can recognize a running state of the first vehicle 10 with reference to the database stored in the server storage unit 22.

For example, the server control unit 23 receives probe data from the first vehicle 10 via the server communication unit 21. As described above, the probe data includes a combination of the first position information P and the second position information Q. Here, it is assumed that the server 20 receives a plurality of pieces of probe data from one or more vehicles 10 together. The server control unit 23 calculates difference information D indicating a difference between the first position information P and the second position information Q for each combination of the first position information P and the second position information Q. In this embodiment, the difference information D is a distance between a position indicated by the first position information P and a position indicated by the second position information Q, but it is not limited thereto.

The server control unit 23 estimates a calculation accuracy S for the first position information P in each road section based on one or more pieces of difference information D in which a position indicated by the corresponding second position information Q is within the road section for each road section. In this embodiment, the server control unit 23 estimates the calculation accuracy S based on an average value of the one or more pieces of difference information D. Here, the average value of the difference information D may be used as the calculation accuracy without any change or levels corresponding to the average value of the difference information D (for example, "high" "middle," and "low") may be used. However, the calculation accuracy S for the first position information P is not limited to the average value of the difference information D, and may be estimated based on an arbitrary statistical index which is calculated using one or more pieces of difference information D.

The server control unit 23 stores each combination of the first position information P and the second position information Q in which the position indicated by the corresponding second position information Q is within a corresponding road section, difference information D of each combination, and the calculation accuracy S for the first position information P in the corresponding road section in the database of the server storage unit 22 for each road section. In the example illustrated in FIG. 4, n combinations of the first position information P (P1 to Pn) and the second position information Q (Q1 to Qn), n pieces of difference information D (D1 to Dn), and one calculation accuracy S are stored in the database in correlation with identification information R1 of the corresponding road section. Road map data in which the calculation accuracy S for the first position information P in each road section is mapped can be generated by combining the road map data stored in the server storage unit 22 with the data stored in the database. For example, the server control unit 23 may update the road map data by mapping the calculation accuracy S onto each road section on the road map.

The server control unit 23 can output at least a part of the road map data in which the calculation accuracy S for the first position information P in each road section is mapped and transmit the part of the road map data to an arbitrary client via the server communication unit 21. Specifically, the server control unit 23 outputs the calculation accuracy S for the first position information P in each road section and transmits the calculation accuracy S to a client. The calculation accuracy may be delivered in a pull type in response to a request from the client or may be delivered in a push type by the server control unit 23. In this embodiment, the server control unit 23 outputs the calculation accuracy S for the first position information P in each road section and transmits the calculation accuracy S to the second vehicle 30.

Figure 5:
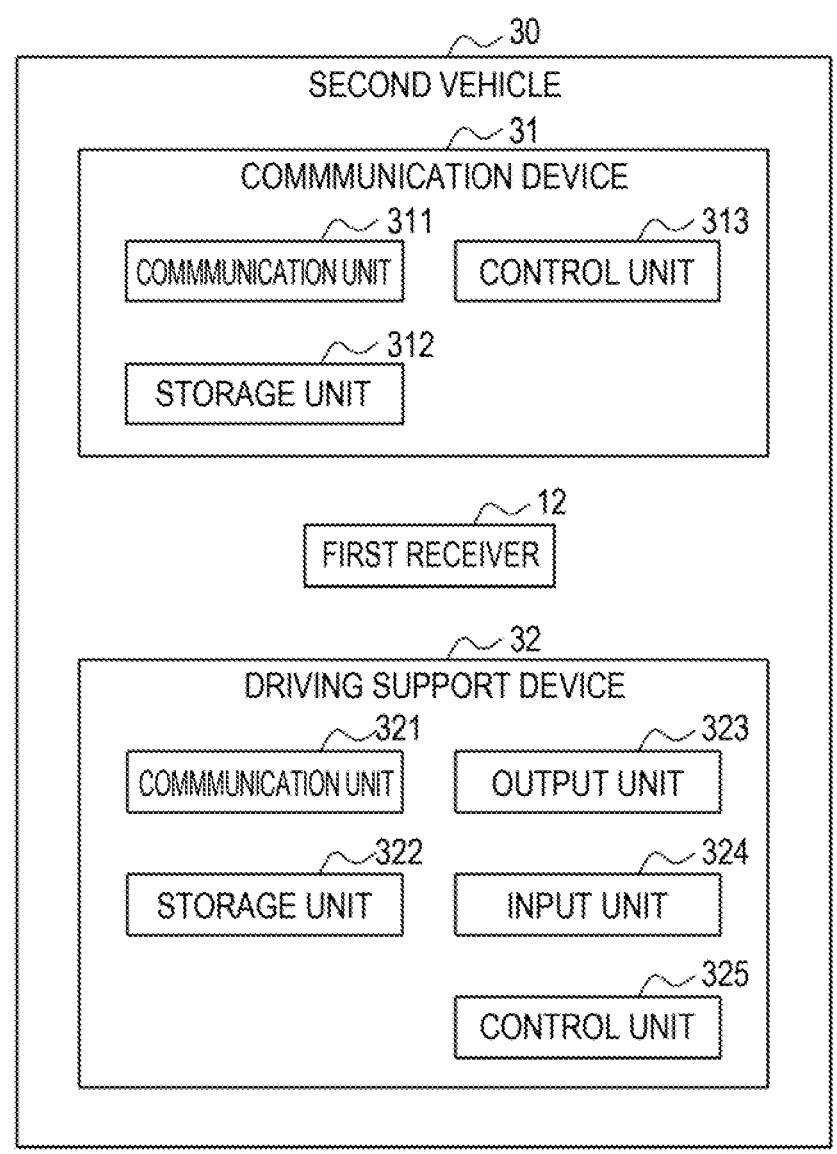
FIG. 5 is a block diagram schematically illustrating a configuration of a second vehicle illustrated in FIG. 1.

The configuration of the second vehicle will be described below. As illustrated in FIG. 5, the second vehicle 30 includes a communication device 31, a first receiver 12, and a driving support device 32. The first receiver 12 is the same as the first receiver 12 of the first vehicle 10. The communication device 31, the first receiver 12. and the driving support device 32 are communicatively connected to each other via an onboard network such as a CAN or a dedicated line.

The communication device 31 is an onboard communication device such as a DCM. Specifically, the communication dev ice 31 includes a communication unit 311, a storage unit 312, and a control unit 313. The communication unit 311 and the storage unit 312 are the same as the communication unit 111 and the storage unit 112 of the communication device 11 of the first vehicle 10.

The control unit 313 includes one or more processors. The control unit 313 controls the whole operation of the communication device 31.

The driving support device 32 is a device that execute driving support of the second vehicle 30. Driving support is, for example, travel route guidance or automatic driving to a destination, but is not limited thereto. For example, automatic driving includes Levels 1 to 5 which are defined in the Society of Automotive Engineers (SAE), but is not limited thereto and may be defined arbitrarily. Driving support may be executed, for example, in cooperation between the driving support device 32 and an electronic control unit (ECU) of the second vehicle 30. The driving support device 32 is, for example, a navigation device or an automatic driving control device that is mounted in the second vehicle 30, but is not limited thereto. Specifically, the driving support device 32 includes a communication unit 321, a storage unit 322. an output unit 323, an input unit 324, and a control unit 325.

The communication unit 321 includes a communication module that performs communication via an onboard network or a dedicated line.

The storage unit 322 includes one or more memories. Each memory included in the storage unit 322 may serve as, for example, a main storage device, an auxiliary storage device, or a cache storage device. The storage unit 322 stores arbitrary information which is used for operation of the driving support device 32. For example, the storage unit 322 may store a system program, an application program, and road map data. Information stored in the storage unit 322 may be updated with, for example, information which is acquired from the network 40 via the communication device 31.

The output unit 323 includes one or more output interfaces that output information to notify a user. For example, each output interface included in the output unit 323 is a display that outputs information as an image or a speaker that outputs information as sound, but is not limited thereto. For example, a display is a panel display or a head-up display, but is not limited thereto. In this embodiment, an "image" may include text, a still image, and a moving image.

The input unit 324 includes one or more input interfaces that detect a user input. For example, each input interface included in the input unit 324 is a physical key, a capacitive key, a touch screen that is provided integrally with a panel display of the output unit 323, or a microphone that receives a sound input, but is not limited thereto.

The control unit 325 includes one or more processors. The control unit 325 controls the whole operation of the driving support device 32. For example, the control unit 325 executes driving support of the second vehicle 30 using the first position information P of the host vehicle acquired from the first receiver 12.

For example, the control unit 325 receives the calculation accuracy S for the first position information P in each road section from the server 20 via the communication device 31. The control unit 325 monitors the first position information P of the host vehicle acquired from the first receiver 12.

When the host vehicle enters the corresponding road section, the control unit 325 performs an operation based on the received calculation accuracy S during travel in the road section. For example, when the calculation accuracy S is equal to or greater than a predetermined reference calculation accuracy, the control unit 325 performs a first operation requiring position information of the host vehicle with a high accuracy (for example, position information of which an error is equal to or less than several cm) satisfying a predetermined reference. On the other hand, when the calculation accuracy S is less than the predetermined reference calculation accuracy, the control unit 325 performs a second operation which can be performed using position information of the host vehicle with a low accuracy (for example, position information of which an error is greater than several cm) not satisfying the predetermined reference or a third operation which can be performed without using the position information of the host vehicle. In this way, the second vehicle 30 can perform an appropriate operation depending on the calculation accuracy for the first position information P.

Figure 6:
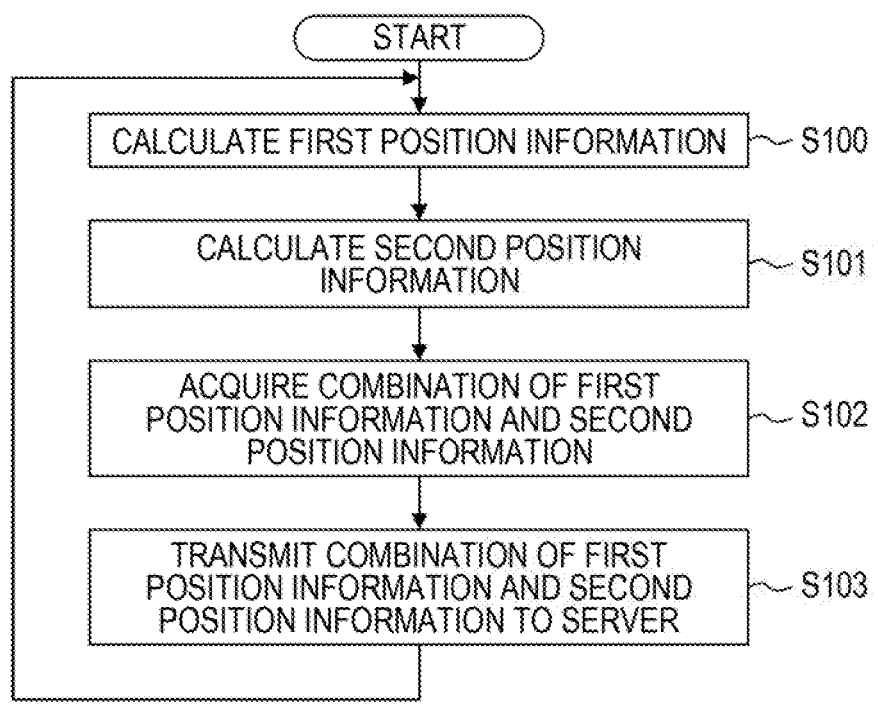
FIG. 6 is a flowchart illustrating a flow of operations of the first vehicle.

A flow of operations of the first vehicle 10 will be described below with reference to FIG. 6.

Step S100: The first receiver 12 calculates first position information P of the host vehicle using positioning signals from the first satellite system.

Step S101: The second receiver 13 calculates the second position information Q which is obtained by correcting an error of the first position information P using a positioning reinforcement signal from the second satellite system.

Step S102: The communication device 11 acquires a combination of the first position information P and the second position information Q.

Step S103: The communication device 11 transmits the acquired combination of the first position information P and the second position information Q to the server 20.

Figure 7:
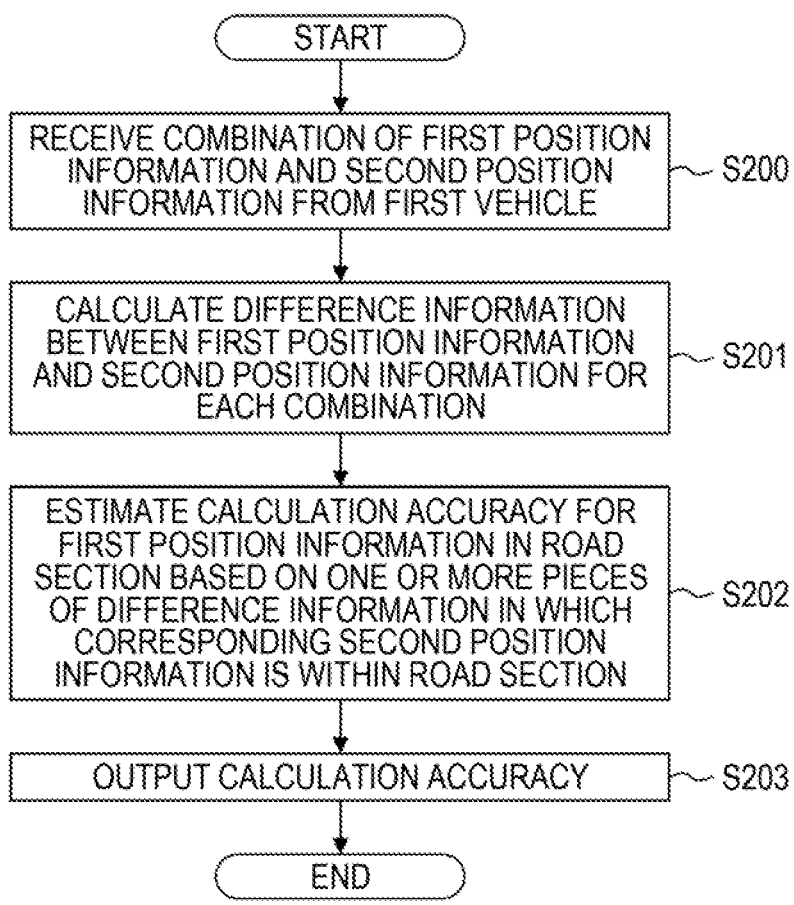
FIG. 7 is a flowchart illustrating a flow of operations of the server.

A flow of operations of the server 20 will be described below with reference to FIG. 7.

Step S200: The server 20 receives first position information P and second position information Q from the first vehicle 10. Here, it is assumed that a plurality of combinations of the first position information P and the second position information Q are received together from one or more first vehicles 10.

Step S201: The server 20 calculates difference information D between the first position information P and the second position information Q for each combination of the first position information P and the second position information Q.

Step S202: The server 20 estimates a calculation accuracy S for the first position information P in each road section on a road map based on one or more pieces of difference information D in which a position indicated by the corresponding second position information Q is within the road section for each road section. The calculation accuracy S is determined, for example, based on an average value of the one or more pieces of difference information D, but is not limited to an average value and may be determined based on an arbitrary statistical index.

Step S203: The server 20 outputs information of the calculation accuracy S for the first position information P in the road section and transmits the information to the second vehicle 30.

Figure 8:
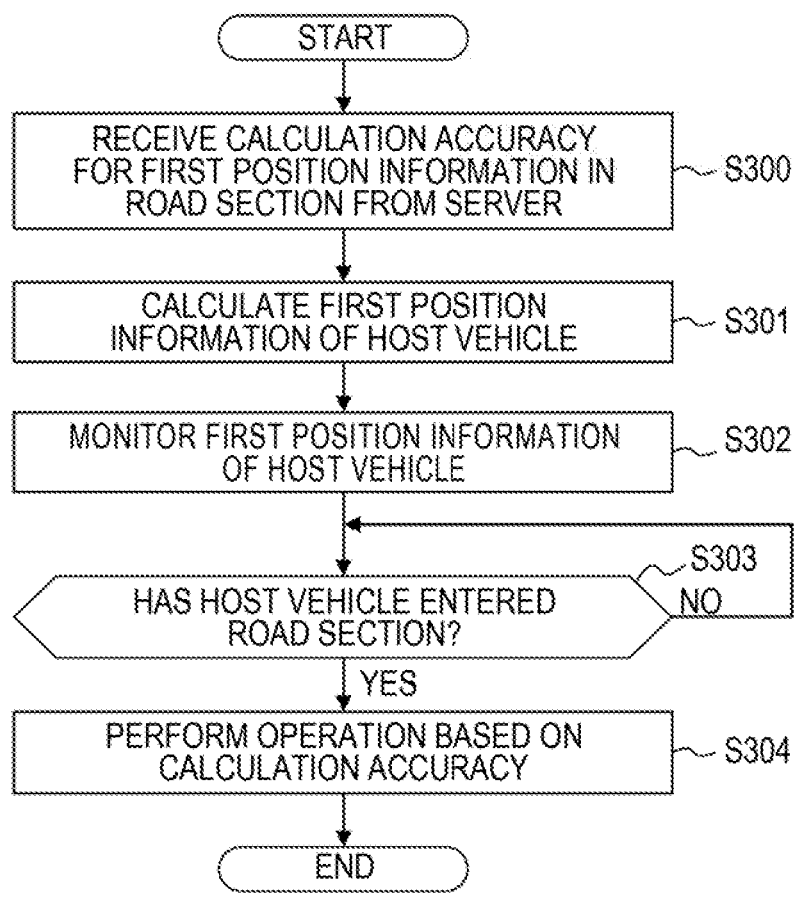
FIG. 8 is a flowchart illustrating a flow of operations of the second vehicle.

A flow of operations of the second vehicle 30 will be described below with reference to FIG. 8.

Step S300: The communication device 31 receives information of a calculation accuracy S for first position information P in each road section from the server 20.

Step S301: The first receiver 12 calculates the first position information P of the host vehicle using positioning signals from the first satellite system.

Step S302: The driving support device 32 monitors the first position information P of the host vehicle which is calculated by the first receiver 12.

Step S303: The driving support device 32 determines whether the host vehicle has entered the road section in Step S300 based on the first position information P of the host vehicle. When it is determined that the host vehicle has entered the road section (YES in Step S303), the flow transitions to Step S304. On the other hand, when it is determined that the host vehicle has not entered the road section (NO in Step S303), the flow returns to Step S303.

Step S304: The driving support device 32 performs an operation based on the calculation accuracy S in Step S300 during travel in the corresponding road section. For example, when the calculation accuracy S is equal to or greater than a predetermined reference calculation accuracy, the first operation requiring position information of the host vehicle with a high accuracy (for example, position information of which an error is equal to or less than several cm) satisfying a predetermined reference is performed. On the other hand, when the calculation accuracy S is less than the predetermined reference calculation accuracy, the second operation which can be performed using position information of the host vehicle with a low accuracy (for example, position information of which an error is greater than several cm) not satisfying the predetermined reference or the third operation which can be performed without using the position information of the host vehicle is performed.

As described above, the information processing system 1 according to this embodiment, calculates difference information D between first position information P and second position information Q for each combination of the first position information P and the second position information Q of the host vehicle which is calculated by the first vehicle 10. The information processing system 1 estimates a calculation accuracy S for the first position information P in a road section based on one or more pieces of difference information D in which a position indicated by the corresponding second position information Q is within the road section and outputs the calculation accuracy S. With this configuration, it is possible to prepare road map data in which the calculation accuracy S for the first position information P is mapped.

While an embodiment of the disclosure has been described above with reference to the drawings, those skilled in the art should note that the disclosure can be modified or corrected in various forms based on this disclosure. Accordingly, it should be noted that the modifications and corrections are included in the scope of the disclosure. For example, the functions included in the devices or the steps can be rearranged without logical inconsistency and a plurality of devices or steps may be combined into one device or step or may be divided.

For example, in the above-mentioned embodiment, some of the elements and the functions of one device or unit may be included in another device. A plurality of devices may be embodied as a single device. For example, some processing operations which are performed by the first vehicle 10 in the above-mentioned embodiment may be performed by the server 20, or some processing operations which are performed by the server 20 may be performed by the first vehicle 10. For example, the process of calculating the difference information D between the first position information P and the second position information Q, which is performed by the server 20 in the above-mentioned embodiment, may be performed by the first vehicle 10.

For example, in the above-mentioned embodiment, the second position information Q is position information which is obtained by correcting the error of the first position information P using a positioning reinforcement signal from the second satellite system. However, the first vehicle 10 may use position information which is obtained by correcting the error of the first position information P using information from a sensor such as an onboard camera in addition to the positioning reinforcement signal from the second satellite system as the second position information Q.

For example, an information processing device such as a smartphone or a computer may serve as the communication device 11 or 31, the first receiver 12, the second receiver 13, the server 20, or driving support device 32 in the above-mentioned embodiment. Specifically, an information processing program in which process details for realizing the functions of the communication device 11 or the like in the embodiment are described is stored in a memory of an information processing device and the information processing program is read and executed by a processor of the information processing device. Accordingly, the disclosure can also be embodied as an information processing program which can be executed by a processor, and as a storage medium storing the information processing program.

What is claimed is:

1. An information processing system comprising:
   a first vehicle configured to receive signals from a first satellite system and a second satellite system;
   a server comprising a processor and a memory and being configured to communicate with the first vehicle; and
   a second vehicle configured to communicate with the server, wherein
   the first vehicle is configured to acquire a combination of first position information and second position information of the first vehicle, the first position information being information which is calculated using a positioning signal from the first satellite system, the second position information being information which is obtained by correcting an error of the first position information using a positioning reinforcement signal from the second satellite system,
   the first vehicle or the server is configured to calculate difference information between the first position information and the second position information for each combination of the first position information and the second position information which are acquired by the first vehicle,
   the server is configured to estimate a calculation accuracy for the first position information in a road section on a road map based on one or more pieces of the difference information in which one or more positions indicated by the second position information corresponding to the difference information are within the road section and to output the calculation accuracy for the first position information in the road section, and
   the second vehicle is configured to:
   receive the calculation accuracy for the first position information in the road section which is output from the server;
   perform an operation based on the calculation accuracy during travel in the road section;
   be capable of receiving a positioning signal from the first satellite system and not be capable of receiving a positioning reinforcement signal from the second satellite system;
   perform a first operation during travel in the road section when the calculation accuracy received from the server is equal to or greater than a reference calculation accuracy, the first operation requiring position information of the second vehicle with a high accuracy satisfying a predetermined reference; and
   perform a second operation or a third operation during travel in the road section when the calculation accuracy received from the server is less than the reference calculation accuracy, the second operation being performed using position information of the second vehicle with a low accuracy not satisfying the predetermined reference, the third operation being performed without using position information of the second vehicle.

2. The information processing system according to claim 1, wherein the server is configured to estimate the calculation accuracy for the first position information in the road section based on an average value of the one or more pieces of the difference information.

3. The information processing system according to claim 2, wherein the server is configured to estimate one of the calculation accuracy which are a plurality of levels of from a high level to a low level based on the average value of the one or more pieces of the difference information as the calculation accuracy.

4. The information processing system according to claim 1, wherein the first satellite system includes a global constellation and the second satellite system includes a local constellation.

5. A non-transitory computer-readable storage medium storing an information processing program to perform operations of an information processing device configured to communicate with a first vehicle and a second vehicle, the first vehicle being configured to receive signals from a first satellite system and a second satellite system, the operations comprising:

receiving a combination of first position information and second position information of the first vehicle from the first vehicle, the first position information being information which is calculated using a positioning signal from the first satellite system, the second position information being information which is obtained by correcting an error of the first position information using a positioning reinforcement signal from the second satellite system;

calculating difference information between the first position information and the second position information for each combination of the first position information and the second position information which are received from the first vehicle;

estimating a calculation accuracy for the first position information in a road section on a road map based on one or more pieces of the difference information in which one or more positions indicated by the second position information corresponding to the difference information are within the road section;

outputting the calculation accuracy for the first position information in the road section;

receiving the calculation accuracy for the first position information in the road section which is output;

performing an operation based on the calculation accuracy during travel in the road section;

being capable of receiving a positioning signal from the first satellite system and not being capable of receiving a positioning reinforcement signal from the second satellite system;

performing a first operation during travel in the road section when the received calculation accuracy is equal to or greater than a reference calculation accuracy, the first operation requiring position information of the second vehicle with a high accuracy satisfying a predetermined reference; and performing a second operation or a third operation during travel in the road section when the received calculation accuracy is less than the reference calculation accuracy, the second operation being performed using position information of the second vehicle with a low accuracy not satisfying the predetermined reference, the third operation being performed without using position information of the second vehicle.

6. A control method for an information processing device that is configured to communicate with a first vehicle and a second vehicle, the first vehicle being configured to receive signals from a first satellite system and a second satellite system, the control method comprising:

receiving a combination of first position information and second position information of the first vehicle from the first vehicle, the first position information being information which is calculated using a positioning signal from the first satellite system, the second position information being information which is obtained by correcting an error of the first position information using a positioning reinforcement signal from the second satellite system;

calculating difference information between the first position information and the second position information for each combination of the first position information and the second position information which are received from the first vehicle;

estimating a calculation accuracy for the first position information in a road section on a road map based on one or more pieces of the difference information in which one or more positions indicated by the second position information corresponding to the difference information are within the road section;

outputting the calculation accuracy for the first position information in the road section;

receiving the calculation accuracy for the first position information in the road section which is output;

performing an operation based on the calculation accuracy during travel in the road section;

being capable of receiving a positioning signal from the first satellite system and not being capable of receiving a positioning reinforcement signal from the second satellite system;

performing a first operation during travel in the road section when the received calculation accuracy is equal to or greater than a reference calculation accuracy, the first operation requiring position information of the second vehicle with a high accuracy satisfying a predetermined reference; and performing a second operation or a third operation during travel in the road section when the received calculation accuracy is less than the reference calculation accuracy, the second operation being performed using position information of the second vehicle with a low accuracy not satisfying the predetermined reference, the third operation being performed without using position information of the second vehicle.

* * * * *